Patented Aug. 11, 1931

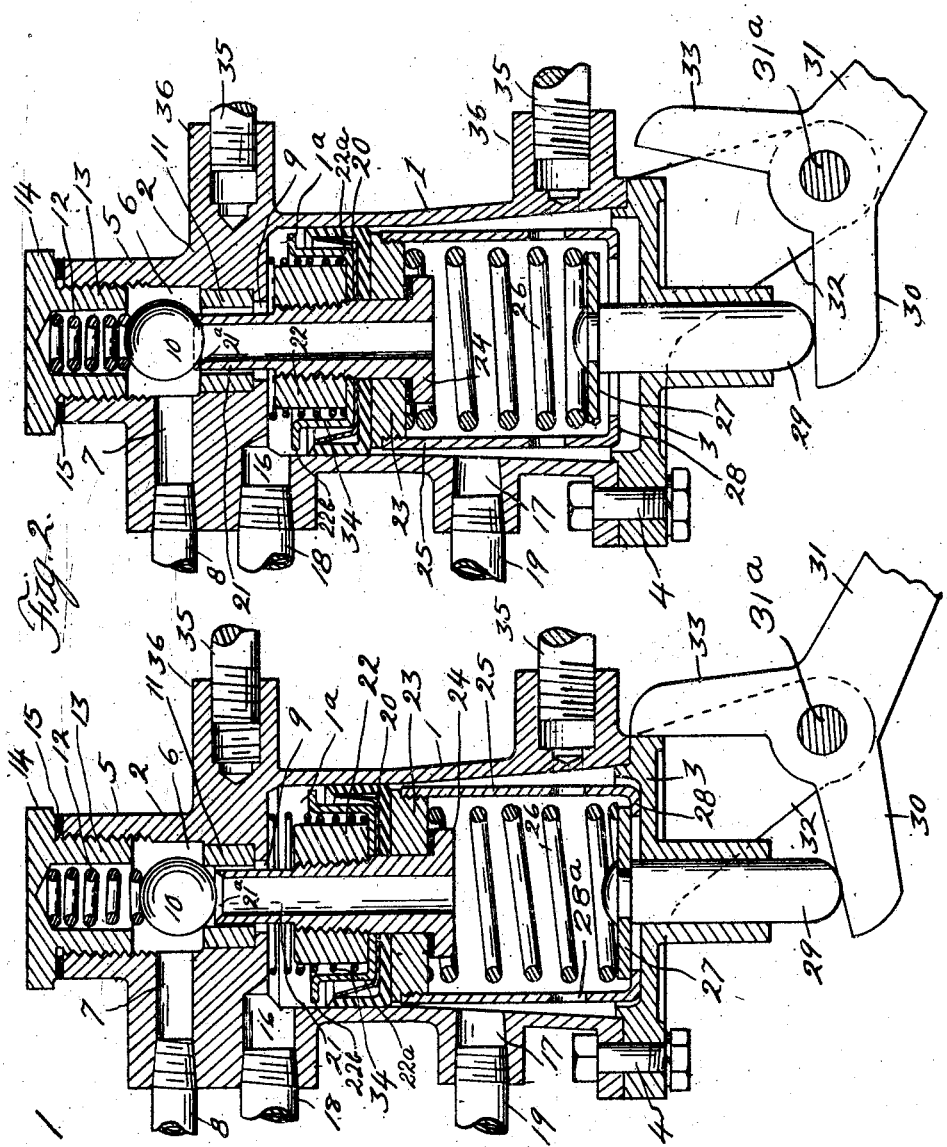

1,818,676

UNITED STATES PATENT OFFICE

WADE DOTY, OF JAMESTOWN, NEW YORK, ASSIGNOR TO INTERNATIONAL AIR BRAKE COMPANY, OF SALT LAKE CITY, UTAH, A CORPORATION OF UTAH

FLUID BRAKING VALVE

Application filed April 11, 1929. Serial No. 354,424.

This invention relates to valves, and particularly to control valves for fluid braking systems. The invention consists in certain improvements upon a type of valve comprising a casing having openings, one of which is adapted to admit air at atmospheric or superatmospheric pressure, another of which is adapted for connection to a brake line, and another of which provides for the exhausting of air, said casing having a piston, or the like, operating therein to control communication between said openings, and having the travel of said piston in one direction so opposed by a spring that a predetermined built-up pressure in the brake line will shift said piston to cut off further delivery of air to said line.

An object of the invention is to maintain said spring opposing travel of the piston under pressure at all times to minimize the amount of travel of the piston required for operation of the valve, and to increase the sensitivity of the valve mechanism in responding to low pressures.

Another object is to facilitate assembly of the valve parts by making the piston-receiving chamber of the casing relatively large at its end through which the piston is inserted, as compared to the other end portion of said chamber in which said piston operates.

Still another object is to attach to the piston of the valve a carrier for a spring through which the piston is manually operable, said carrier comprising an abutment for the spring which is movable to and from the piston to compress and relax the spring.

These and various other objects the invention attains by the construction hereinafter described and illustrated in the accompanying drawings, wherein:

Figure 1 is an axial vertical sectional elevation of the improved valve showing the valve member thereof in its normal seated position.

Figure 2 is a similar sectional elevation, showing a brake applying position of the parts.

In these views the reference character 1 designates a casing having a main cylindrical chamber 1a therein, and formed at its upper end with an integral head 2, the lower end of said casing being closed by a removable head 3 secured in place by bolts 4, or the like.

The head 2 is formed with an integral upward projection 5 in which is formed a valve chamber 6 opening in the top of said projection. A lateral opening 7 in the head 2 provides for delivery to said valve chamber of compressed air by a pipe 8 from any suitable source of supply, and a port 9 provides for delivery of such air from said chamber to the main chamber 1a of the casing. A ball valve member 10 controls the port 9 and preferably engages a seating ring 11 inserted in the bottom portion of said chamber. The valve member 10 is normally held to its seat by a coiled spring 12, which abuts against, and is set into a plug 13 screw-threaded into the projection 5 and closing the upper end thereof. As shown, said plug has its upper end annularly flanged, as indicated at 14, to compress a gasket or the like, 15, against the projection 5 to establish an air-tight seal.

The casing 1 is formed with openings 16 and 17 communicating respectively with its upper end and mid-portion for connection with pipes 18 and 19, the former being a brake line and the latter serving to conduct exhaust fluid to any desired point.

In the cylindrical upper portion of the chamber 1a, between the openings 16 and 17, there operates a piston comprising a cup leather 20, and the lower portion of said chamber is gradually downwardly flared to facilitate insertion of the piston into its working position. The piston cup leather is upwardly flanged to bear upon the wall of the chamber 1a, and through its center extends a tubular stem 21, having a threaded portion engaged by a nut 22 clamping a cupped sheet-metal stamping 22a against the top face of the cup leather. Said stamping is formed at its top with an annular exterior flange 22b which extends adjacent to the wall of the chamber 1a and tends to prevent the flow of air removing a supply of grease or other lubricant which is packed upon the piston around said stamping, beneath its flange 22b. The stem 21 projects upwardly through the port 9 and its upper end extends normally adjacent to the valve member 10 and is internally beveled as indicated at 21a to form a seat engageable by said valve member to close the passage through said stem when the piston and stem are raised to a predetermined extent.

In addition to its parts 20, 22 and 22a, said piston comprises a follower plate 23, preferably of circular form, clamped against the under face of the cup leather by the headed lower end 24 of the stem 21.

Upon said follower plate is screw-threaded the upper end of a tubular carrier 25 for a spring 26 constantly compressed between said plate and an abutment disc 27, normally resting freely upon a flange 28 internally formed upon the lower end of said carrier. One or more ports 28a are preferably formed in said carrier to provide for delivery to the exhaust opening 17 of air admitted to said carrier through the tubular stem.

The abutment disc 27 has centrally riveted thereto a downwardly projecting plunger 29 which is slidable in a bearing externally formed upon the head 3 and is upwardly actuable by a finger 30 terminally formed upon an operating lever 31. The latter is pivotal upon a pin 31a journaled in a pair of lugs 32 downwardly projecting from the head 3, and a second finger 33 integrally formed upon said lever, serves as a stop engageable with the lower end of the casing 1 to limit downward swinging of the finger 30, and to thus normally establish that position of the lever 31 illustrated in Figure 1.

The spring 26 is sufficiently heavy that it is adapted to withstand a predetermined desired maximum brake line pressure upon the piston as hereafter more fully explained. The spring 12 which normally seats the valve member 10 is comparatively light and a third spring 34, which is of still lighter construction, is compressed between the upper end of the chamber 1a and the piston, tending to normally maintain the lowered position shown in Figure 1 of said piston and the parts carried thereby.

The described valve may be mounted upon a vehicle in any suitable manner, as by means of a pair of supporting bolts 35 tapped into bosses 36 integrally projecting from the upper and lower ends of the casing.

To apply the brakes (not shown), the lever 31 is actuated to raise the plunger 29 and abutment disc 27. The spring 26 is sufficiently stiff to initially undergo no compression, raising the piston 20 in opposition to the relatively weak spring 34. When, however, initial piston travel has engaged the stem 21 with the valve member 10, further travel is additionally opposed by the spring 12 and there results a slight compression of the spring 26 preliminary to lifting of the valve member 10 from its seating ring 11. Normally the brake line 18 freely communicates with the exhaust pipe 19 through the hollow stem 21, and such communication is cut off when the piston, by its initial travel seats the ball 10 on the upper end of said stem. When continued upward actuation of the piston raises the valve member 10 from the seating ring 11, fluid is delivered from the supply line 8 to the brake line 18, building up pressure in the latter line and chamber 1a (above the piston) until such pressure overcomes the spring 26, forcing the piston downwardly until the valve member 10 again engages the seating ring 11, cutting off further fluid delivery to the brake line. If, under these conditions, the operator still maintains pressure on the lever 31, the stem 21 will remain closed by the valve member 10 and such pressure as has been built up in the brake line will be maintained. The operator may reduce brake line pressure to any desired extent by more or less relieving the force applied to the lever 31 and may again build up such pressure by increasing the applied force to again lift the ball 10 from its seat 11.

Thus it is apparent that the described valve provides for an accurate regulation of control and accomplishes this result with a minimum travel of the piston, since the spring 26 is under constant compression and no initial motion is lost in bringing said spring under compression.

While it will be apparent that the illustrated embodiment of my invention herein disclosed is well calculated to adequately fulfill the objects and advantages primarily stated, it is to be understood that the invention is susceptible to variation, modification, and change within the spirit and scope of the subjoined claims.

What I claim is:

1. A fluid braking control valve comprising a casing having a plurality of openings, a piston slidable in said casing exercising control of said openings, a spring bearing at one end against said piston, an abutment for the other end of said spring, movable toward the piston to compress said spring, a seat for said abutment rigidly carried by the piston, and means effective upon the piston through said abutment and spring to actuate the piston.

2. A fluid braking control valve comprising a casing having a plurality of openings, a piston slidable in said casing, exercising control of said openings, a spring bearing at one end against said piston, an abutment for the other end of the spring, movable toward the piston to compress said spring, a tubular member enclosing said spring secured at one end to the piston, a seat for said abutment carried by the other end of said tubular member, and means effective upon the piston through said abutment and spring to actuate the piston.

3. A fluid braking control valve comprising a casing having a plurality of openings, a piston slidable in said casing exercising control of said openings, an abutment, a seat for said abutment rigidly carried by said piston at one side thereof, said abutment freely engaging said seat, a resilient member compressed between the piston and said abutment, and means effective upon the piston through said abutment and resilient member to actuate the piston.

4. A fluid braking control valve comprising a casing having a plurality of openings, a valve member controlling communication between said openings, a piston slidable in said casing and exercising control of said valve member, said piston having a port controlled by said valve member, an abutment, a seat for said abutment rigidly carried by said piston at one side thereof, a resilient member compressed between said piston and abutment, and means effective upon the piston through said abutment and resilient member to actuate the piston.

5. A fluid braking control valve comprising a casing having a plurality of openings, a piston slidable in said casing and exercising control of said openings, a spring acting at one end against said piston, a tubular member enclosing said spring and secured at one end to said piston, and means effective upon the piston through said spring to actuate the piston, said casing having its piston-receiving end portion interiorly proportioned for working engagement with said piston, and being flared from said end portion toward its other end to establish a clearance from said tubular member.

In testimony whereof I sign this specification.

WADE DOTY.